No. 850,203. PATENTED APR. 16, 1907.
R. E. BARKER.
ELECTRIC MOTOR.
APPLICATION FILED MAR. 12, 1906.

WITNESSES.
W. Ray Taylor.
Helen Oxford

INVENTOR.
RALPH E. BARKER.
Albert G. Davis
by Atty.

UNITED STATES PATENT OFFICE.

RALPH E. BARKER, OF LYNN, MASSACHUSETTS, ASSIGNOR TO GENERAL ELECTRIC COMPANY, A CORPORATION OF NEW YORK.

ELECTRIC MOTOR.

No. 850,203.  Specification of Letters Patent.  Patented April 16, 1907.

Application filed March 12, 1906. Serial No. 305,463.

*To all whom it may concern:*

Be it known that I, RALPH E. BARKER, a citizen of the United States, residing at Lynn, county of Essex, State of Massachusetts, have invented certain new and useful Improvements in Electric Motors, of which the following is a specification.

My invention relates to electric motors of the type provided with voltage-controlling means; and its object is to provide simple means for insuring the starting of such motors with a high torque.

While my invention in its broader aspect is not limited to any particular type of motor it is especially applicable to single-phase induction-motors which have comparatively small starting torque and which for many purposes—as for instance, in driving electric fans—are provided with inductances in series with the primary winding and a switch for cutting out variable portions of inductance, so as to control the speed of the motor. When such an arrangement is employed, if the switch is left in a low-speed position, so that most of the inductance is in the motor-circuit and if the starting friction or other load is comparatively high the motor may fail to start. It often happens that a fan-motor, with its speed-controlling switch, is installed on the wall or some inaccessible place and is wired up to an ordinary snap-switch, which may be a considerable distance from the motor. Under such conditions it is evident that some provision is desirable for making the motor start even though all of the speed-regulating coil is in series with the motor-windings.

My invention consists in providing the motor with automatic means for short-circuiting the speed-regulating inductance at starting, and for this purpose I employ a centrifugally-actuated switch carried by the rotor. When the motor is at rest, the inductance in series with it is short-circuited by the switch, which opens when the motor comes up to speed. If for any reason the motor stops, the short-circuiting switch closes, shunting the entire inductance, leaving the motor in position to receive full-line voltage when the circuit is again closed, and thus to develop its maximum starting element.

My invention will best be understood by reference to the accompanying drawings, in which—

Figure 1:
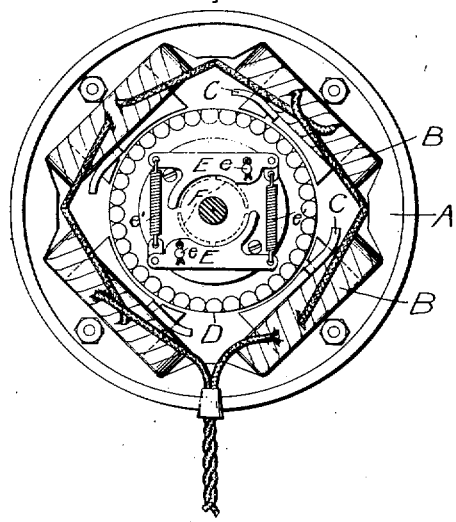
Figure 2:
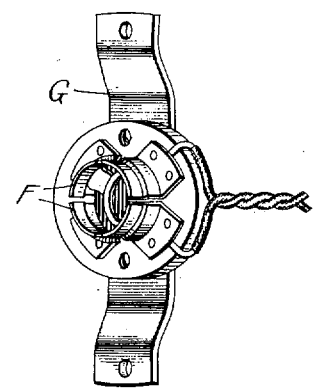
Figure 3:
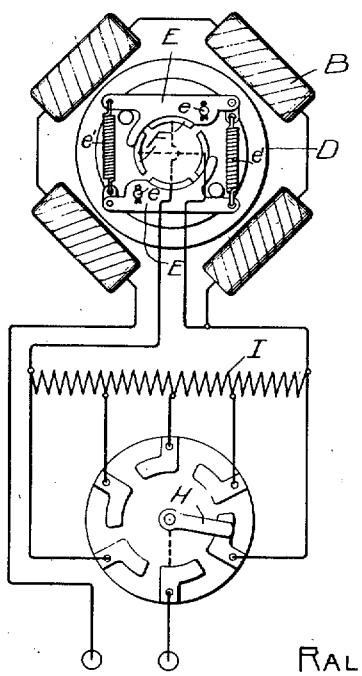

Figure 1 shows a single-phase induction-motor arranged in accordance with my invention, one end bearing being removed. Fig. 2 shows a perspective view of the end bearing, and Fig. 3 is a diagram of circuit connections.

In the drawings, A represents the primary member of the motor, which is provided with the field-coils B. The field-poles carry the short-circuited conductors C, which distort the field at starting, so as to give a starting torque.

D represents the rotor, which is shown as of the squirrel-cage type.

A motor constructed as shown in Fig. 1 has at best a comparatively low starting torque, as is well understood in the art. With normal voltage at the motor-terminals this torque is sufficient for many purposes—as, for instance, driving a fan. If, however, the terminal voltage is greatly reduced, the motor may be unable to start under the friction-load of the fan.

E E represent contacts pivoted at $e$ $e$ on the rotor and provided with springs $e'$, which when the motor is at rest hold the contact members E in engagement with the stationary contacts F, which are supported by the member G, as shown in Fig. 2. These contacts are indicated in dotted lines in Fig. 1. Four contacts F are employed, opposite contacts being cross-connected so as to form two pairs. Each pair is connected to a terminal of an inductance I, which is in series with the primary winding B of the motor.

H represents a switch which is arranged to cut varying portions of the inductance I out of circuit. In the position shown in Fig. 3 all of the inductance I is cut out of circuit by the switch H, so that the motor is directly connected across the line. If the switch H is rotated in a counter-clockwise direction, successive portions of the inductance will be cut into circuit, thereby lowering the voltage impressed on the motor-terminals. In this manner the speed of the motor may be conveniently regulated, but if the switch H were left in a low-speed position, so as to include the greater portion of the inductance I in circuit with the motor, and current were then supplied to the motor to start it the voltage impressed on the motor-terminals would be so much reduced that the motor which at best has a small starting torque might not start at all. By employing the centrifugal contacts E, however, the inductance I is always short-circuited at starting, since these contacts bridge the stationary contacts F, connected to the inductance-terminals. As the motor comes up to speed the contacts E are thrown outwardly by centrifugal force, thereby removing the short-circuit from the inductance, so that it comes into play to control the motor speed.

I do not desire to limit myself to the particular construction and arrangement of parts here shown, but aim in the appended claims to cover all modifications which are within the scope of my invention.

What I claim as new, and desire to secure by Letters Patent of the United States, is—

1. In combination with an electric motor, an impedance normally in series with said motor, and automatic means for short-circuiting said impedance at starting.

2. In combination with an electric motor, an impedance normally in series with said motor, and a centrifugally-actuated switch connected to said motor and arranged to short-circuit said impedance when the motor is at rest.

3. In combination with an electric motor, an impedance in series with the motor, a manually-operated switch arranged to cut variable portions of said impedance out of circuit, and means for automatically short-circuiting said impedance at starting.

4. In combination with an electric motor, an impedance in series with the motor, a manually-operated switch arranged to cut variable portions of said impedance out of circuit, and a centrifugally-actuated switch connected to said motor and arranged to short-circuit said impedance when the motor is at rest.

5. In combination with an electric motor, manually-operated means for controlling the voltage impressed on the motor, and automatic means for rendering said manually-operated controlling means inoperative at starting.

6. In combination with an electric motor, manually-operated means for controlling the voltage impressed on the motor, and a centrifugally-actuated switch connected to the motor and arranged to render said manually-operated controlling means inoperative when the motor is at rest.

7. In combination with an induction-motor, an inductance in series with the motor, a manually-operated switch arranged to cut variable portions of said inductance out of circuit, and means for automatically short-circuiting said inductance at starting.

8. In combination with an induction-motor, an inductance in series with the motor, a manually-operated switch arranged to cut variable portions of said inductance out of circuit, and a centrifugally-actuated switch connected to said motor and arranged to short-circuit said inductance when the motor is at rest.

9. In combination with an induction-motor, an inductance in series with the motor, stationary contacts connected to terminals of said inductance, and a contact member carried by the rotor of the motor arranged to bridge said stationary contacts when the motor is at rest and to be moved out of engagement therewith by centrifugal force when the motor speeds up.

10. In combination with an induction-motor, an inductance in series with the motor, a manually-operated switch arranged to cut variable portions of said inductance out of circuit, stationary contacts connected to terminals of said inductance, and a contact member carried by the rotor of the motor arranged to bridge said stationary contacts when the motor is at rest and to be moved out of engagement therewith by centrifugal force when the motor speeds up.

In witness whereof I have hereunto set my hand this 9th day of March, 1906.

RALPH E. BARKER.

Witnesses:
JOHN A. McMANUS, Jr.,
HENRY O. WESTENDARP.